United States Patent Office 3,839,390

Patented Oct. 1, 1974

3,839,390
POLYPEROXIDES AFFORDING SEQUENTIAL FREE RADICAL GENERATION

Antonio J. D'Angelo, Buffalo, and Orville L. Mageli, Kenmore, N.Y., assignors to Pennwalt Corporation, Philadelphia, Pa.

No Drawing. Continuation-in-part of abandoned application Ser. No. 745,411, July 17, 1968. This application Oct. 19, 1970, Ser. No. 82,079
Int. Cl. C07c *73/00, 73/02;* C08f *1/60*
U.S. Cl. 260—453 R 15 Claims

ABSTRACT OF THE DISCLOSURE

Novel peroxy compounds having at least two functional peroxy groups, at least one of these functional groups having a half-life different from the other functional group or groups. Example: di[1,3-dimethyl-3-(-t-butylperoxy) butyl]peroxydicarbonate.

These "polyperoxides" are used in preparing polymers having peroxy groups which are then useful in the preparation of block copolymers.

CROSS-REFERENCE TO RELATED APPLICATION

This application is a continuation-in-part of our copending application Ser. No. 745,411, filed July 17, 1968, now abandoned.

BACKGROUND OF THE INVENTION

1. Field of the Invention

This invention relates to compounds having at least two functional peroxy groups, where at least one of these groups has a half-life different from the other group(s) present, which "polyperoxides" are capable of being used for the sequential generation of free radicals.

2. The Prior Art

Polyperoxides are known: U.S. Pats 2,455,569, 3,117,166, 3,225,079 and 3,297,738 are illustrative. In general the art has provided compounds where all the functional peroxy groups are the same; these therefore cannot normally be used as sequential free radical generators.

U.S. Pat. 2,536,008 discloses a compound having an ordinary peroxy group (—C—OO—C—) and a sulfonylperoxy group

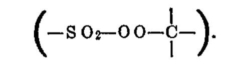

This compound cannot be used as a sequential free radical generator because the type of sulfonyl peroxide disclosed decomposes ionically (Chem. Revs. *66*, 529 (1966).

SUMMARY OF THE INVENTION

The polyperoxy compounds of the invention are called sequential free radical initiators because one of the peroxide functions present in the same molecule can be preferentially decomposed to generate free radicals for a particular application (e.g. vinyl monomer polymerization) while keeping the remaining function(s) substantially undecomposed for a later application (e.g. formation of a block copolymer with another vinyl monomer polymerization).

These sequential and/or preferential decompositions can be accomplished by a variety of techniques. One method is to use two different temperatures, taking advantage of the difference in the thermal rates of decomposition of the different peroxide functions present in the molecule. Another method, also based on the different thermal rates of decomposition, is to use the same temperature but different reaction times. Still another method is to use activators e.g. amines, transition metal salts etc., which preferentially decompose some of the peroxide functions present while the others remain intact. The remaining peroxide functions then can be decomposed either thermally or by irradiation (e.g. ultraviolet).

Still another technique is to decompose one portion thermally and the remaining by irradiation or vice-versa. Another method is to use two different radiation sources in sequence where one source preferentially decomposes one portion of the peroxide function present and the other source attacks the remaining peroxide functions. Thus, by taking advantage of the difference in the physical and chemical properties of these novel peroxy-compounds a variety of techniques can be used for sequential free radical generation. Sequential free radical generation is very useful in the vinyl polymerization field. Block copolymers can be made from any combination of polymerizable vinyl monomers. Sequential free radical generation is also employed in the conventional polymerization of ethylene and styrene. The present art accomplishes this by using two or more polymerization initiators of different thermal stability.

The novel polyperoxy sequential radical initiators can be broadly represented by the general structure:

$$P'—R—P'' \quad (I)$$

where P' and P'' are different and represent the peroxy-containing functional groups, and R can be an alkyl, arylalkyl, aryl, cycloalkyl, unsaturated alkyl, alkyl-cycloalkyl or cycloalkyl-aryl diradical of 1 to 17 carbons and optionally can contain one or more non-adjacent oxygen, sulfur or nitrogen atoms in the backbone structure. For example, R can be $—CH_2—$, $—C_2H_4—$,

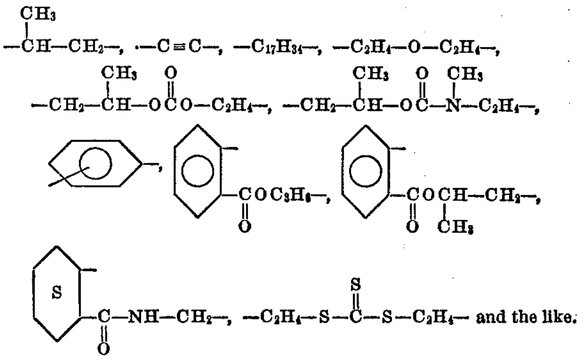

More specifically, structure (I) may be broken down into the following three preferred groups of novel polyperoxy sequential radical initiators:

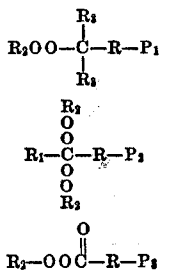

(II), (III) and (IV)

where R=as defined above;

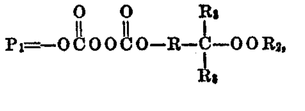

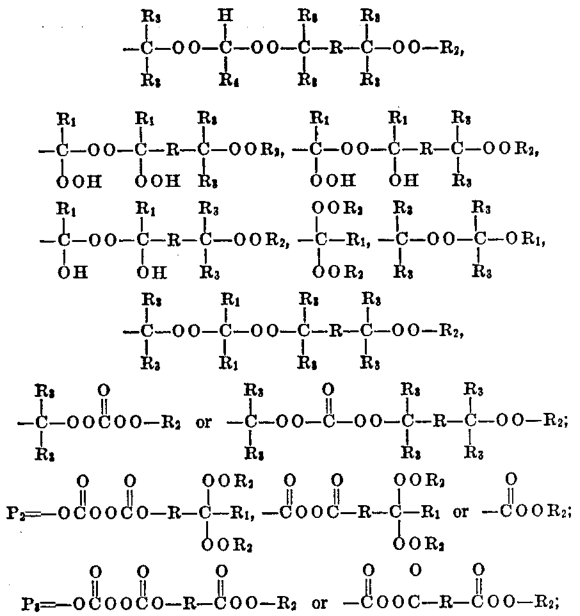

$R_1$=alkyl of 1 to 10 carbons (for example; methyl butyl, octyl, etc.);

$R_2$=tertiary-alkyl, tertiary-cycloalkyl or tertiary-aralkyl of 4 to 13 carbons;

$R_3$=alkyl of 1 to 10 carbons and, taken together with R, can form a 3–10 membered hydrocarbon ring–; and $R_4$=alkyl of 1 to 10 carbons (e.g., methyl, butyl, octyl), phenyl, tolyl, xylyl or chlorophenyl.

Most preferably, $R_1$ and $R_3$ are alkyl of 1–4 carbons and $R_2$ is t-alkyl of 4–7 carbons. R preferably contains 1–10 carbons with 0–3 non-adjacent carbon, sulfur or nitrogen atoms in the backbone structure.

In addition to compounds shown in the examples, the following polyfunctional peroxy compounds are operable in the preparation of block and graft copolymers and can be prepared by conventional methods:

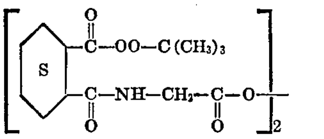

1.

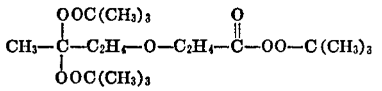

2.

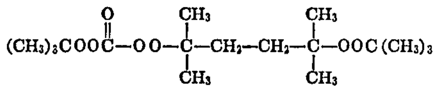

3.

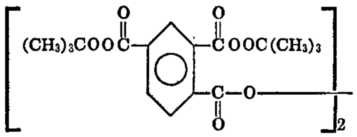

4.

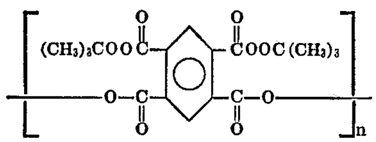

5.

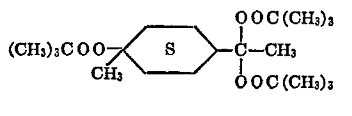

6.

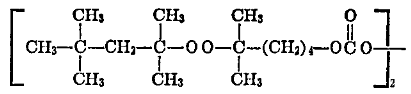

7.

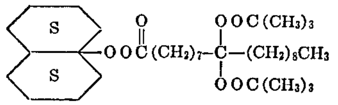

8.

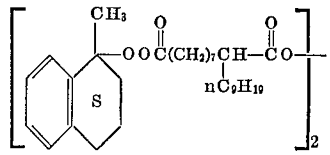

9.

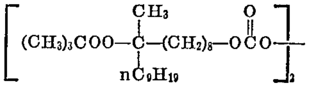

10.

DESCRIPTION

I. Method of Preparation

Preparation of sequential free radical initiators of this invention is illustrated by the following examples:

EXAMPLE I

Preparation of Di[1,3-dimethyl-3-(t-butylperoxy)butyl] peroxydicarbonate

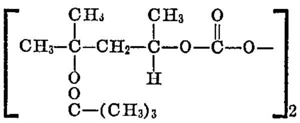

Structure (II)

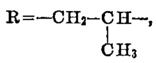

and

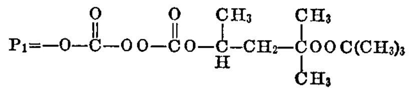

To a solution of 10.8 g. (0.02 moles) of $H_2O_2$ (6%) cooled at 5±1° C. was added 8.8 g. (0.04 moles) of NaOH (20%). After the addition was completed three drops of a 27% solution of Tergitol was added. To this mixture was added 7.85 g. (0.03 moles) of 1,3-dimethyl-3-(t-butylperoxy)butyl chloroformate [prepared by reacting 1,3-dimethyl-3-(t-butylperoxy)butanol with phosgene (see pages 16–23, of copending application Serial No. 727,323, filed May 7, 1968)]. The mixture was allowed to stir for three hours at 26±1° C. and for one hour at 40±1° C. After this time the reaction mixture was extracted with diethyl ether. The ether extract was washed with water to neutrality, dried over anhydrous magnesium sulfate, filtered and the solvent evaporated under reduced pressure. A colorless liquid weighing 5.2 g. was obtained. The IR of this material showed the characteristic bands for the desired products. The peroxydicarbonate

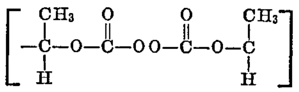

portion of the molecule has a 10 hour half-life at 45° C. and the dialkyl peroxide portion has a 10 hour half-life at approximately 128° C.

EXAMPLE II

Preparation of di[4,4-di(t-butylperoxy)valeroyl]peroxide

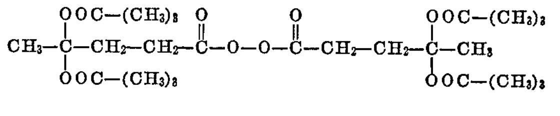

Structure (III) where R=—$CH_2$—$CH_2$— and

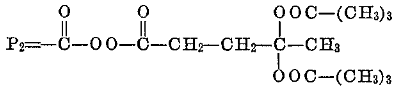

To a solution of 7.8 g. (0.1 mole) of sodium peroxide in 40 ml. of $H_2O$ cooled at 10±1° C. was added a solution of 11.8 g. (0.2 moles) of 4,4-di-(t-butylperoxy) valeric anhydride (91%) (see British Pat. No. 1,047,830) in 300 ml. of benzene. The addition was made in five minutes. As the addition progressed the reaction temperature gradually rose to 30±1° C. The reaction mixture was allowed to stir for one hour at this temperature. At the end of this time the reaction mixture was diluted with 250 ml. of water and the organic phase separated and washed with water to neutrality. The organic phase was dried over anhydrous magnesium sulfate, filtered and the solvent evaporated under reduced pressure. A weight yield of 7.9 g. of thick oil was obtained. This oily product on standing solidified. M.P. 32–35° C. Active oxygen content was 12.74%. Theoretical active oxygen for the desired product 14.4%. The I.R. indicated that the desired product was prepared. The diacyl peroxide

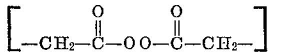

portion of the molecule has a 10 hour half-life at approximately 69° C. and the diperketal portion

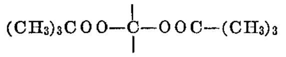

has a 10 hour half-life at approximately 110° C.

EXAMPLE III

Preparation of 2,2,4-tris(t-butylperoxy)-4-methylpentane

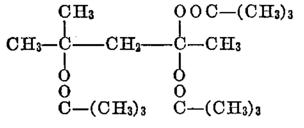

Structure (II) where R=—$CH_2$— and

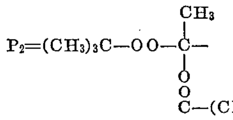

To a mixture of 10.1 g. (0.05 moles) of 2-methyl-2-(t-butylperoxy)-4-pentanone (which may be prepared according to Example 9 of copending application Ser. No. 727,335, filed May 7, 1968), and 11.45 g. (0.1 moles) of t-butyl hydroperoxide (78.5%) containing 18% di-t-butyl peroxide cooled at 0±1° C. was added 37.4 g. of $H_2SO_4$ (69%) over a period of one hour. Care was taken during the addition of the sulfuric acid that the reaction temperature was controlled at 5±1° C. After the addition was completed the mixture was allowed to react for five hours at 5±1° C. At the end of this period the mixture was poured over crushed ice and the organic phase separated, washed with $H_2O$ to neutrality, dried over anhydrous magnesium sulfate, filtered and the volatiles stripped under reduced pressure. A weight yield of 8 g. was obtained. The I.R. indicated that the desired product was prepared. The diperketal portion

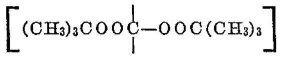

of the molecule has a 10 hour half-life at approximately 110° C. and the dialkyl portion

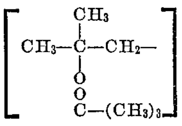

has a 10 hour half-life at approximately 128° C.

EXAMPLE IV

Preparation of di[2-(t-butylperoxycarbonyl)ethyl] peroxydicarbonate

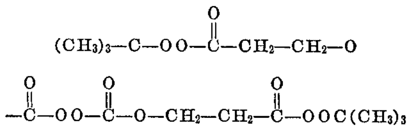

Structure (IV) where: R=—$CH_2$—$CH_2$— and

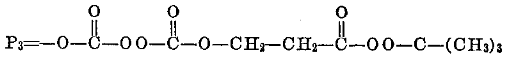

To a solution of 15.8 g. (0.0361 moles+10% excess) of sodium hydroxide (10%) cooled at 5±1° C. was added 7 g. (0.0181 moles+10% excess) of hydrogen peroxide (10%). After the addition was completed one drop of wetting agent was added (aquet) and 10.8 g. (0.0361 moles) of 2-(t-butylperoxycarbonyl) ethyl chloroformate (75%) (may be prepared according to Example of Procedure II, page 19, of copending application Ser. No. 727,323, filed May 7, 1968) was added dropwise over a period of five minutes. After the addition was completed the mixture was allowed to stir for two hours at 20±1° C. At the end of this period the reaction mixture was extracted with diethyl ether. The ether extract was washed with water to neutrality, dried over anhydrous magnesium sulfate, filtered and the solvent evaporated under reduced pressure. A weight yield of 7.4 g. was obtained. Purity determined by active oxygen content was 93.5%. The I.R. indicated that the desired product was prepared. The peroxydicarbonate

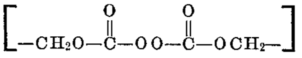

portion of the molecule has a 10 hour half-life at approximately 45° C. and the peroxyester

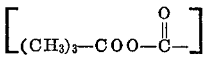

portion has a 10 hour half-life at approximately 102° C.

EXAMPLE V

Preparation of di[2-(t-butylperoxycarbonyl)benzoyl] peroxide

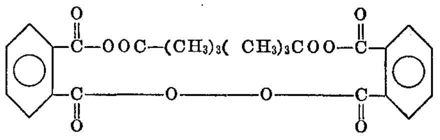

Structure (IV) where:

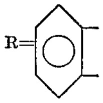

and

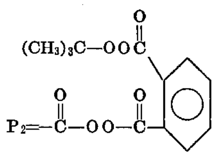

To 10 ml. of water cooled at 5± 1 C. was added 0.8 g. (0.01 moles) of sodium peroxide and one drop of 27% solution of tergitol. This mixture was allowed to stir for 10 minutes and then 5.3 g. (0.02 moles) of t-butyl o-(chloroformyl)peroxybenzoate (95.5%) (may be prepared according to the Example of Procedure I, page 18, of copending application Ser. No. 727,323, filed May 7, 1968), was added over a period of five minutes while the reaction temperature was controlled at 5± 1° C.

After the addition was completed the reaction mixture was allowed to stir for 30 minutes at 5± 1° C. At the end of this time the reaction mixture was diluted with water and the organic phase extracted with diethyl ether. The ether extract was washed with water to neutrality, dried over anhydrous magnesium sulfate, filtered and the solvent evaporated under reduced pressure. A weight yield of 4 g. of viscous liquid was obtained. The I.R. of this material indicated that the desired product was prepared. The diacyl peroxide portion

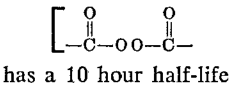

of the molecule has a 10 hour half-life at approximately 69° C. and the peroxyester portion

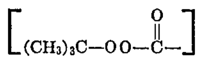

has a 10 hour half-life at approximately 102° C.

EXAMPLE VI

Preparation of di-[1,3-dimetyhl-1-hydroperoxy-3-(t-butylperoxy)butyl] peroxide

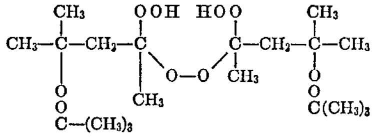

Structure(II) where:

R=—$CH_2$— and

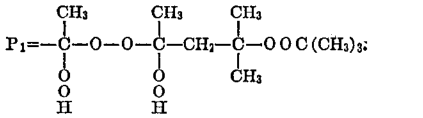

To 10.2 g. (0.15 moles) of hydrogen peroxide (50%) cooled at 5± 1° C. was added 9.5 g. of sulfuric acid (77%). After the addition was completed, the reaction temperature was lowered to 0± 1° C. and 10.1 g. (0.05 moles) of 2-methyl-2(t-butylperoxy)-4-pentanone was added dropwise at such a rate that the reaction temperature could be controlled at 0± 1° C. After the addition was completed the mixture was allowed to stir for four hours at 5± 1° C. At the end of this time the reaction mixture was poured over crushed ice and the organic phase separated by extraction with diethyl ether. The ether solution was washed to neutrality with water, dried over anhydrous magnesium sulfate, filtered and the solvent evaporated under reduced pressure. A weight yield of 9 g. of a viscous liquid was obtained. The I.R. of this material indicated that the desired product was prepared. The hydroperoxy portion

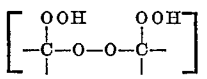

of the molecule is activated with metal catalyst down to R.T. and the dialkyl peroxide portion remains intact with a 10 hour half-life of 128° C.

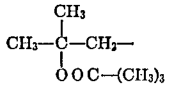

EXAMPLE VII

Preparation di[3,3-bis(t-butylperoxy)butyl] peroxydicarbonate

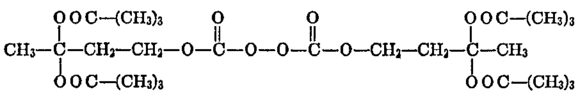

(A)

Structure (III) where:

R=—$CH_2$—$CH_2$— and

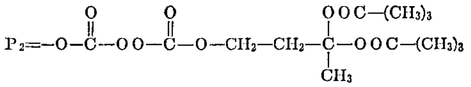

To a solution of 8.1 g. (0.02 moles + 10%) of $H_2O_2$ (9%) cooled at 5± 1° C. was added 8.8 g. (0.04 moles + 10%) of NaOH (20%). After the addition was completed three drops of a 27% solution of Tergitol was added. To this mixture was added 12.6 g. (0.04 moles) of 3,3-bis(t-butylperoxy)butyl chloroformate (99.6%) (prepared by treating ethyl 3,3-di-(t-butylperoxy) butyrate with $LiAlH_4$ to give 3,3-di-(t-butylperoxy) butanol in 91.6% corrected yield and 97.6% assay according to active oxygen content, and treating said butanol with excess phosgene-see pages 16–22 of copending application Ser. No. 727,323, filed May 7, 1968). The mixture was allowed to stir for three hours at 30± 1° C. After this time the reaction mixture was extracted with pentane. The ether extract was washed with water to neutrality, dried over anhydrous magnesium sulfate, filtered and the solvent evaporated under reduced pressure. A solid was obtained 4.8 g. M.P. 48–50° C. The I.R. of this material showed the characteristic bands for the desired product. The peroxydicarbonate portion

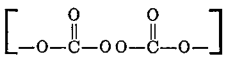

of the molecule has a 10 hour half-life at approximately 45° C. and the diperketal portion has a 10 hour half-life at approximately

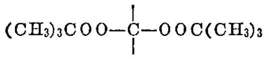

110° C.

EXAMPLE VIII

Preparation of t-Butylperoxy-[4, 4-di-(t-butylperoxy)-valerate]

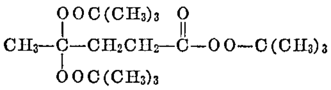

(A)

4,4-Di-(t-butylperoxy) valeric anhydride was reacted with the sodium salt of t-butyl hydroperoxide in an aqueous system. The product (A) was a colorless liquid having an assay of 83.0% according to active oxygen content. The corrected yield was 16.3%. An I.R. spectrum showed the absence of an OH band, a peroxyester C=O band at 1780 $cm.^{-1}$ and a broad —OO— band centered at about 870–880 $cm.^{1}$.

Proof of Structure (A): (A) was hydrolyzed by a large excess of aqueous 20% sodium hydroxide solution at 45–50° C. over a period of 2.0 hours. After neutralizing with 5% aqueous HCl solution, a white solid resulted which was taken up in ethyl ether. The ether solution was dried over anhydrous $MgSO_4$ and the ether solvent was removed in vacuo to give a 61% yield of 4,4-di(t-butylperoxy) valeric acid (B). An I.R. spectrum of this product and that of authentic (B) were identical. The melting points of this product, authentic (B) and a 50:50 weight mixture of the two were 76–80° C., 78.5–82° C. and 77–81° C., respectively.

EXAMPLE IX

Preparation of di-[4-(t-butylperoxy)-1,1,4,4-tetramethylbutyl]diperoxycarbonate

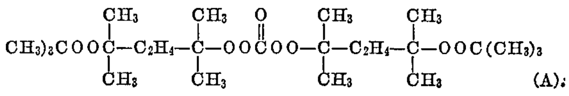

(A);

To a vigorously stirred solution of 9.9 grams (0.034 mole) of 80.7% 4-(t-butylperoxy)-1,1,4,4-tetramethylbutyl hydroperoxide (B) and 2.7 g. (0.034 mole) of pyridine at 0° C., was added 1.7 g. (0.017 mole) of liquid phosgene in 25 ml. of cold diethyl ether over a period of 20–25 minutes. The mixture was then stirred for 3.5 hours at 0° C., after which 25 ml. of ether and 25 ml. of water were added to the system. The resulting ether solution was then washed with 25 ml. of water, with 25 ml. of aqueous 5% HCl solution, with saturated aqueous $Na_2CO_3$ solution and finally with water to neutral. After drying the ether solution over anhydrous $Na_2SO_4$, the ether was removed in vacuo to give 8.7 g. of viscous liquid. An I.R. of the product showed a small OH band at 3350 $cm.^{-1}$ [small amount of unreacted (B)], a strong C=O band at 1790 $cm.^{-1}$ and a —OO— band at 875 $cm.^{-1}$. The active oxygen content of the diperoxycarbonate function was 4.80% (theoretical: 6.47%), hence the assay and corrected yield, based on diperoxycarbonate active oxygen content, were 74% and 64%, respectively. The total active oxygen content was 9.17% (theoretical: 12.92%) and therefore, the assay and corrected yield based on total active oxygen content were 71% and 62%.

EXAMPLE X

Preparation of 2-(t-butylperoxy)-5-(1-methoxy-1-methylperoxy)-2,5-dimethylhexane

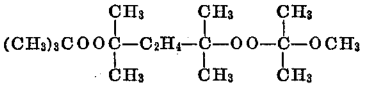

(A)

To a well-stirred solution of 9.55 g. (0.033 mole) of 80.7% 4 - (t-butylperoxy) - 1,1,4,4-tetramethylbutyl hydroperoxide (B) in 34.0 g. (0.33 mole) of 2,2-dimethoxypropane at 0° C., was added 5.0 g. of commercially available "Amberlyst Resin -15" (cation exchange resin) over a period of about one minute. The mixture was stirred for 6 hours at 0° C., after which the mixture was filtered and the filtrate was stripped of excess 2,2-dimethoxypropane, methanol and other volatiles in vacuo. An I.R. of the obtained light-yellow liquid product (11.6 g.) showed no OH band and two equally intense bands, one at 875 $cm.^{-1}$ which corresponded to the dialkyl peroxide —OO— group, $(CH_3)_3C—OO—C(CH_3)_2CH_2—$, and the other at 855 $cm.^{-1}$ which corresponded to the ether peroxide —OO— group, $$—CH_2—C(CH_3)_2—OO—C(CH_3)_2—OCH_3.$$

Corrected yield of the product was 100% based on active oxygen analysis.

EXAMPLE XI

Preparation of 2,2-Di-[4′-(t-butylperoxy)-1′,1′,4′-trimethylpentylperoxy]propane

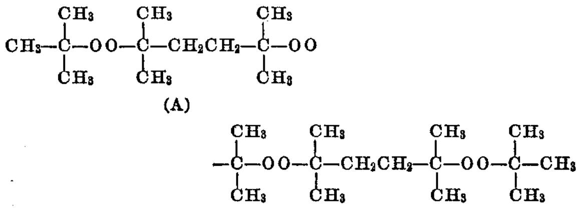

To a vigorously stirred solution of 11.5 g. (0.20 mole) of acetone, 11.5 g. (0.039 mole) of 80.7% 4-(t-butylperoxy) - 1,1,4-trimethylpentyl hydroperoxide (B) and 30 ml. of

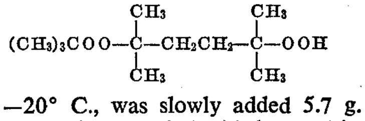

(B)

pentane at —20° C., was slowly added 5.7 g. of 77% $H_2SO_4$ over a 10 minute period and the resulting mixture was stirred for 4.0 hours at —20° C. The pentane layer was then separated, washed with 10% aqueous KOH solution, then with water to neutral and dried over anhydrous $MgSO_4$. After separation of the desiccant, the pentane was removed in vacuo, leaving 9.5 g. (95% of theory, uncorrected) of liquid product. The diperoxyketal "active oxygen" content was 5.33% (theory, 6.30%), hence, the assay of the product was 84.5% and the corrected yield was 80.0%. The product contained 0.18% hydroperoxide "active oxygen," hence it contained about 2.5% of (B).

EXAMPLE XII

Preparation of 1,1-Di-[4′-(t-butylperoxy)-1′,1′,4′-trimethylperoxy]-1-phenylmethane

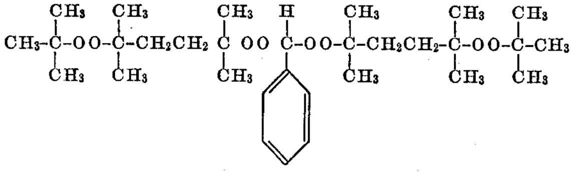

(A)

To a vigorously stirred solution of 1.91 g. (0.018 mole) of benzaldehyde, 9.30 g. (0.0396 mole) of 99% 4-(t-butylperoxy)-1,1,4-trimethylpentyl hydroperoxide (B) and 40 ml. of pentane at —20° C., was slowly added 4.6 g. of 77% $H_2SO_4$ over a 10 minute period and the resulting mixture was stirred for 4.0 hours at —20° C. The pentane layer was then separated, washed with 10% aqueous KOH solution, then with water to neutral and dried over anhydrous $MgSO_4$. After separation of the desiccant, the pentane was removed in vacuo, leaving 9.8 g. (98% of theory, uncorrected) of liquid product. The diperoxyacetal "active oxygen" content was 5.27% (theory, 5.75%), hence the assay of the product was 91.6% and the corrected yield was 90.0%. The product contained 0.21% hydroperoxide "active oxygen," hence it contained about 3.0% of (B).

II. Utility

The sequential free radical initiators of this invention may be used in any operation or reaction where a peroxy compound could be used, taking into account the sequental free radical generation characteristic. Thus they can be used to polymerize vinyl monomers and cure unsaturated polyester resins, by decomposing partially or simultaneously all the peroxy functions present. They also can be used to prepare polymers containing peroxy groups as part of the polymer. These polymers are very useful for the preparation of block and graft copolymers, which is the preferred use of the compounds of this invention.

III. Methods of Utilization

The sequential free radical initators of this invention are useful to prepare polymers from vinyl monomers (e.g. styrene, vinyl chloride, vinyl acetate, ethyl acrylate, methyl methacrylate, butadiene-acrylonitrile, acrylamide, acrylic acid, vinylcarbazole, vinyltoluene, vinylpyridine, vinylidene chloride and the like) by decomposing them at a temperature where all the peroxides functions can be decomposed.[1] Similarly, unsaturated polyester resins can be cured by conventional methods. On the other hand if polymerization of vinyl monomers is carried out in such a way that only partial decomposition of the peroxy functions is obtained, while the others remain substantially undecomposed, then peroxide containing polymers are prepared (Examples XIII and XV). These peroxide containing polymers can be stored for later use or can be utilized for preparation of block or graft copolymers (Examples XIV and XV). The temperatures at which the polymerization are carried out will depend upon the polymerization technique, the monomer and the physical proper-

[1] Dickey U.S. Pat. No. 2,698,863 at col. 5 gives an excellent presentation of conventional vinyl polymerization techniques and suitable monomers for peroxy group iniators—this is adopted as suitable for the compounds and adaptable for the sequential free radical initiated processes of this invention.

ties desired in the polymer, but most important of all upon the half-life of the sequential free radical initiator used. The half-lives of the sequential free radical initiators can be determined by conventional methods. However, it may not be necessary to accurately determine the half-life of each portion of the sequential free radical initiators since most half-lives can be predicted within a few degree from the closest monoperoxy analog, many of which are well known. Ten-hour half-life ranges of some typical peroxides are given in Table II.

TABLE II

Ten-hour half-life temperature ranges of various peroxides

| Peroxide class | General structures | 10 hours half-life range, ° C. |
|---|---|---|
| Alkyl peroxides | 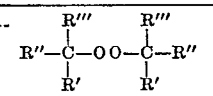 | ~117-128 |
| Di.eroxyketals | 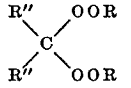 | ~101-110 |
| t-Alkyl peroxyesters | 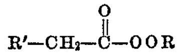 | ~102 |
| | 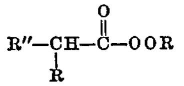 | ~66-79 |
| | 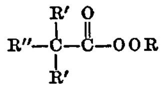 | ~54-55 |
| | 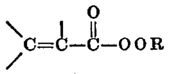 | ~98-105 |
| O-alkyl O,O-t-alkyl monoperoxycarbonates | 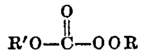 | ~99 |
| Diacyl peroxides | 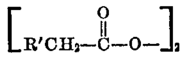 | ~61-69 |
| | 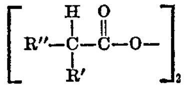 | ~23-34 |
| | 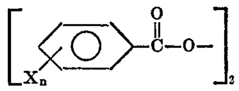 | ~54-75 |
| Acetyl alkylsulfonyl peroxides. | 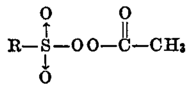 | ~25-31 |
| Ketone peroxides | 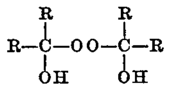 | ~85-105 |
| Alkyl α-alkoxyalkyl peroxides. | 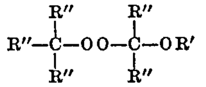 | ~87-111 |
| Peroxydicarbonates | 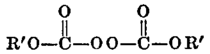 | ~45 |
| Di-t-alkyl diperoxy carbonates. | 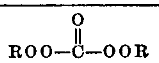 | ~90-95 |

NOTE.—Where R=t-alkyl radical; R', R'', R'''=aliphatic or aromatic radical.

The following examples will illustrate the utility of the products of this invention without limiting its scope.

Preparation of peroxy containing polymers

Description of the method

For sequential free radical initiators containing peroxide function of different half-life values, the first polymerization was either a thermal emulsion or suspension polymerization carried out at a lower temperature sufficient to preferably activate the more active peroxide group. The second polymerization to form the block or graft copolymer consisted: in purifying first polymer by precipitation to remove residual peroxide, dissolving it in distilled methyl methacrylate and sealing this mixture in a 13 x 150 mm. test tube.

Usually 1 g. of the first polymer was dissolved in 10 ml. of methyl methacrylate. In each case the reaction tube was placed in a 100° C. constant temperature bath for a period not less than one hour. The reaction tube was immediately quenched after removal from the bath and the polymer mixture was separated into various fractions by solvent non-solvent precipitation techniques specific for each polymer species. The isolated fractions in each case were identified through their infrared spectrum and comparison with known spectra of the possible polymers present in the mixture. Confirmation of block or graft copolymer formation was obtained when a fraction had spectral characteristics of both homopolymer species. Further evidnece for the formation of a polystyrene-poly (methyl methacrylate) block or graft copolymer was obtained from the demixing test similar to those of Hughes and Brown [2] and Molau.[3]

EXAMPLE XIII

Preparation of peroxide containing polystyrene using the sequential free radical initiator prepared in Example I.

To 5 g. of distilled styrene was added 1 g. of di[1,3-dimethyl-3-(t-butylperoxy)butyl]peroxydicarbonate. The reaction mixture was kept under nitrogen in a sealed tube at 50° C. for 16 hours. The polymer obtained is dissolved in benzene and precipitated with absolute methanol (4 times). After drying under vacuum the conversion of monomer to polymer was 92%. The polymer was analyzed by iodometric titration and it was found to contain 0.79% active oxygen. A blank run under the same condition but without an initiator gave only a 0.5% conversion of monomer to polymer.

EXAMPLE XIV

Preparation of a polystyrene-poly (methyl methacrylate) block co-polymer from the peroxy containing polystyrene of Example XIII.

A mixture of 9 g. of methyl methacrylate and 1 g. of the peroxy containing polystyrene from example XIII was heated at 100° C. under nitrogen in a sealed tube for 16 hours. The resultant reaction mixture was dissolved in benzene and the block copolymer precipitated with petroleum ether, (4 times). After drying, it weighed 4.6 g. In a blank run, methyl methacrylate gave no polymer after 16 hours at 100° C.

The infrared spectrum showed the characteristic absorption bands of polystyrene and poly(methyl methacrylate). Further evidence for the formation of polystyrene-poly(methyl methacrylate) block copolymer was obtained from the demixing tests as shown below.

| | Control | Test XIV |
|---|---|---|
| Polystyrene homopolymer, g | 0.39 | 0.39 |
| Poly(methyl methacrylate) homopolymer, g | 0.39 | 0.39 |
| Polystyrene-poly (methyl methacrylate) block copolymer, g | | 0.39 |
| Chloroform, g | 5.22 | 5.22 |
| Demixing time | [1] | [2] |

[1] 50 min.
[2] 16 hrs.

[2] Hughes and Brown, J. Appl. Poly. Sci. 7, 59 (1963).
[3] Molau, J. Polymer Sci. A3-1267 (1965).

EXAMPLE XV

Preparation of a Styrene/Methyl Methacrylate Block Copolymer Using di-[3,3-di(t-butylperoxy)butyl peroxydicarbonate (A) of Example VII as a free-radical initiator 1.5 grams of (A) and 15 g. of styrene monomer were placed in a sealed glass tube and held at 60° C. for 8 hours. The resulting polymer was dissolved in benzene and precipitated from methanol. This procedure was repeated twice more and, after drying, 11 g. of polystyrene was obtained having an A.O. (active oxygen) content of 0.53%. 1.0 gram of this polystyrene and 2.0 g. of methyl methacrylate monomer (MMA) were placed in a sealed glass tube for two hours at 100° C. The resulting styrene/MMA block copolymer was taken up in benzene and precipitated from methanol to give 2.94 g. of block copolymer after drying.

A solution of 3 g. of 13% polystyrene in $CHCl_3$, a solution of 3 g. of 13% PMMA in $CHCl_3$ and 0.39 g. of the styrene/MMA block copolymer from above were thoroughly mixed and phases were allowed to separate. Twenty-five hours were required for two clear phases to be obtained.

Control Experiment: A solution of 3 g. of 13% polystyrene in $CHCl_3$ and a solution of 3 g. of 13% PMMA (polymethyl methacrylate) in $CHCl_3$ were thoroughly mixed and the phases allowed to separate. Two clear phases were observed after only 45 minutes.

These results show that a styrene/MMA block copolymer was prepared since it compatibilized mixtures of $CHCl_3$ solutions of polystyrene and PMMA.

What is claimed is:

1. A polyperoxy initiator selected from:

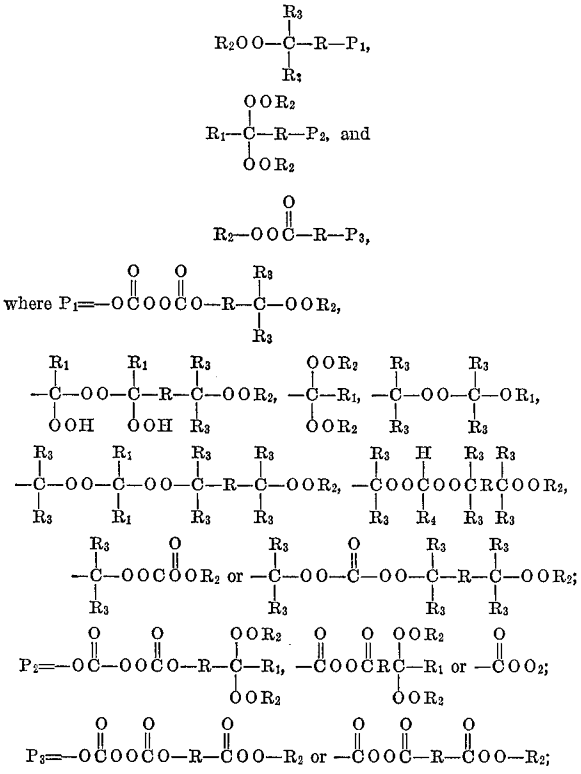

R is a phenyl diradical or an alkyl, alkylcycloalkyl or phenalkyl diradical of 1–17 carbons optionally containing an —O—, —C(=O)NH— or —C(=O)O— linking group in the backbone structure;

$R_1$ and $R_3$ are alkyl of 1–10 carbons;

$R_2$ is t-alkyl, t-cycloalkyl or t-aralkyl of 4–13 carbons; and $R_4$ is phenyl.

2. A polyperoxy sequential free radical intiator selected from:

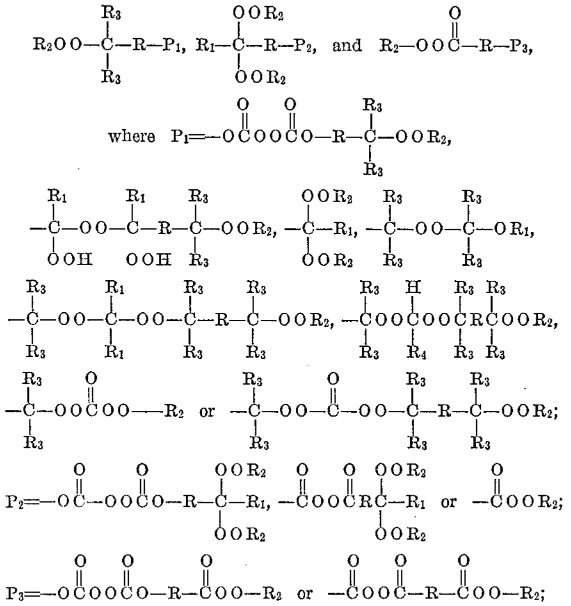

R=a diradical selected from phenyl and alkyl or alkylcycloalkyl of 1–17 carbons optionally containing —O— or —C—(=O)NH— linking group in the backbone structure;

$R_1$ and $R_3$=alkyl of 1–10 carbons; $R_2$=t-alkyl, t-cycloalkyl or t-aralkyl of 4–13 carbons; and $R_4$=phenyl.

3. An initiator as in Claim 2 where the diradical R does not contain a linking group.

4. Di-[1,3-dimethyl-3-(t - butylperoxy)butyl]peroxydicarbonate.

5. Di-[1,3-dimethyl-1-hydroperoxy-3-(t - butylperoxy)-butyl]peroxide.

6. 2,2,4-Tris(t-butylperoxy)-4-methyl pentane.

7. Di-[4-(t - butylperoxy)-1,1,4,4-tetramethylbutyl]diperoxycarbonate.

8. 2-(t - Butylperoxy)-5-(1-methoxy-1-methylethylperoxy)-2,5-dimethylhexane.

9. Di-[4,4-di-(t-butylperoxy)valeroyl]peroxide.

10. Di[3,3-bis(t-butylperoxy)butyl]peroxydicarbonate.

11. t-Butylperoxy[4,4-di(t-butyl-peroxy)valerate].

12. Di-[2-(t - butylperoxycarbonyl)ethyl]peroxydicarbonate.

13. Di-[2-(t-butylperoxycarbonyl)benzoyl]peroxide.

14. 2,2-Di-[4' - (t - butylperoxy)-1',1',4'-trimethylpentylperoxy]propane.

15. 1,1-Di-[4' - (t - butylperoxy)-1',1',4'-trimethylpentylperoxy]-1-phenylmethane.

References Cited

Ol'dekop et al., J. of Org. Chem. of USSR, vol. 4, No. 3, pp. 419–422, March 1968.

LEWIS GOTTS, Primary Examiner
D. G. RIVERS, Assistant Examiner

U.S. Cl. X.R.

260—463, 610 R, 610 D, 88.3 R, 89.1, 89.5 A, 89.7 R, 92.8 R, 93.5 R, 469, 478, 471 C, 482 C, 455 B, 561 R, 874, 876 B, 879, 884, 886